(12) United States Patent
Huang et al.

(10) Patent No.: US 9,985,275 B2
(45) Date of Patent: May 29, 2018

(54) THREE DIMENSIONAL ELECTRODE HAVING ELECTRON DIRECTING MEMBERS AND METHOD OF MAKING THE SAME

(71) Applicant: Nissan North America, Inc., Franklin, TN (US)

(72) Inventors: Kan Huang, Northville, MI (US); Nilesh Dale, Novi, MI (US); Xiaoguang Hao, Wixom, MI (US); Jessica Weber, Berkley, MI (US); Ying Liu, Walled Lake, MI (US)

(73) Assignee: Nissan North America, Inc., Franklin, TN (US)

( * ) Notice: Subject to any disclaimer, the term of this patent is extended or adjusted under 35 U.S.C. 154(b) by 444 days.

(21) Appl. No.: 14/928,253

(22) Filed: Oct. 30, 2015

(65) Prior Publication Data
US 2017/0125839 A1    May 4, 2017

(51) Int. Cl.
*H01M 4/04*    (2006.01)
*H01M 4/66*    (2006.01)
*H01M 4/70*    (2006.01)
*H01M 4/75*    (2006.01)
(Continued)

(52) U.S. Cl.
CPC ......... *H01M 4/0428* (2013.01); *H01M 4/043* (2013.01); *H01M 4/661* (2013.01); *H01M 4/663* (2013.01); *H01M 4/70* (2013.01); *H01M 4/75* (2013.01); *H01M 4/78* (2013.01); *H01M 10/052* (2013.01); *H01M 2220/20* (2013.01); *Y02E 60/122* (2013.01)

(58) Field of Classification Search
CPC .... H01M 4/0428; H01M 4/043; H01M 4/661; H01M 4/663; H01M 4/70; H01M 4/75; H01M 4/78
See application file for complete search history.

(56) References Cited

U.S. PATENT DOCUMENTS 7,000,297 B2    2/2006  Frustaci et al.
7,250,233 B2    7/2007  Choi et al.
7,553,584 B2    6/2009  Chiang et al.
(Continued)

FOREIGN PATENT DOCUMENTS

WO            9950921 A1    10/1999

*Primary Examiner* — Daniel McNally
(74) *Attorney, Agent, or Firm* — Young Basile Hanlon & MacFarlane, P.C.

(57) ABSTRACT

A method of making a three dimensional electrode having an active material layered between a current collector and a separator includes growing nanotubes at predetermined points on a first sheet of electron directing material, wherein the electron directing material is highly conductive and chemically inert; aligning the nanotubes in a direction perpendicular to the first sheet; functionalizing a distal end of each nanotube; bonding a second sheet of electron directing material to the functionalized distal end of each nanotube; depositing magnetic particles along the second sheet; applying a magnetic field to the magnetic particles to rotate the first sheet, the second sheet and the nanotubes ninety degrees to form an electron directing structure; and attaching the electron directing structure on a surface of the current collector with a polymer binder. The electron directing structure is configured to direct electron flow along a layered direction of the three dimensional electrode.

19 Claims, 4 Drawing Sheets

(51) Int. Cl.
*H01M 4/78* (2006.01)
*H01M 10/052* (2010.01)

(56) References Cited

U.S. PATENT DOCUMENTS

| | | |
|---|---|---|
| 7,972,537 B2 | 7/2011 | Meng et al. |
| 7,988,896 B2 | 8/2011 | Zhang et al. |
| 8,669,008 B2 | 3/2014 | Cho et al. |
| 8,920,978 B1 | 12/2014 | Gross et al. |
| 9,093,693 B2 | 7/2015 | Zhamu et al. |
| 2010/0297502 A1 | 11/2010 | Zhu et al. |
| 2011/0123866 A1 | 5/2011 | Pan et al. |
| 2012/0183856 A1 | 7/2012 | Cui et al. |
| 2013/0077515 A1 | 3/2013 | Jung et al. |
| 2014/0023920 A1 | 1/2014 | Yamazaki et al. |
| 2014/0045065 A1 | 2/2014 | Bao et al. |
| 2014/0057179 A1 | 2/2014 | Yushin et al. |
| 2015/0221929 A1 | 8/2015 | Lu |
| 2017/0221645 A1* | 8/2017 | Gangopadhyay ...... H01G 11/34 |

* cited by examiner

THREE DIMENSIONAL ELECTRODE HAVING ELECTRON DIRECTING MEMBERS AND METHOD OF MAKING THE SAME

TECHNICAL FIELD

This disclosure relates to an electrode having a three dimensional structure with electron directing members extending from the current collector and a method of making the three dimensional structure.

BACKGROUND

Hybrid vehicles (HEV) and electric vehicles (EV) use chargeable-dischargeable power sources. Secondary batteries such as lithium-ion batteries are typical power sources for HEV and EV vehicles. Lithium-ion secondary batteries typically use carbon, such as graphite, as the anode electrode. Graphite materials are very stable and exhibit good cycle-life and durability. However, graphite material suffers from a low theoretical lithium storage capacity of only about 372 mAh/g. This low storage capacity results in poor energy density of the lithiumion battery and low electric mileage per charge.

To increase the theoretical lithium storage capacity, silicon has been added to active materials. However, silicon active materials suffer from rapid capacity fade, poor cycle life and poor durability. One primary cause of this rapid capacity fade is the massive volume expansion of silicon (typically up to 300%) upon lithium insertion. Volume expansion of silicon causes particle cracking and pulverization. This deteriorative phenomenon escalates to the electrode level, leading to electrode delamination, loss of porosity, electrical isolation of the active material, increase in electrode thickness, rapid capacity fade and ultimate cell failure.

SUMMARY

Disclosed herein are methods of making a three dimensional electrode having an active material. One method of making the three dimensional electrode having the active material layered between a current collector and a separator includes growing nanotubes at predetermined points on a first sheet of electron directing material, wherein the electron directing material is highly conductive and chemically inert; aligning the nanotubes in a direction perpendicular to the first sheet; functionalizing a distal end of each nanotube; bonding a second sheet of electron directing material to the functionalized distal end of each nanotube; depositing magnetic particles along the second sheet; applying a magnetic field to the magnetic particles to rotate the first sheet, the second sheet and the nanotubes ninety degrees to form an electron directing structure; and attaching the electron directing structure on a surface of the current collector with a polymer binder. The electron directing structure is configured to direct electron flow along a layered direction of the three dimensional electrode.

Another method of making a three dimensional electrode for a battery as disclosed herein includes growing carbon nanotubes at predetermined points on a first sheet of graphene; decorating the carbon nanotubes with magnetic particles; aligning the nanotubes in a direction perpendicular to the first sheet by applying a magnetic force to the magnetic particles; functionalizing a distal end of each nanotube; bonding a second sheet of graphene to the functionalized distal end of each nanotube; depositing additional magnetic particles along the second sheet; applying a magnetic field to the additional magnetic particles to rotate the first sheet, the second sheet and the nanotubes ninety degrees to form an electron directing structure; and attaching the electron directing structure on a surface of a current collector with a polymer binder.

These and other aspects of the present disclosure are disclosed in the following detailed description of the embodiments, the appended claims and the accompanying figures.

BRIEF DESCRIPTION OF THE DRAWINGS

The invention is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity. Included in the drawings are the following figures.

DETAILED DESCRIPTION

Because the carbon material used in electrodes of conventional batteries, such as lithium ion batteries or sodium ion batteries, suffers from a low specific capacity, the conventional battery has poor energy density even though there is small polarization and good stability. Furthermore, batteries having electrodes of graphite or other carbon materials develop increased internal resistance over time, which decreases their ability to deliver current.

To address the poor energy density of carbon based electrodes, alternative active materials with higher energy densities are desired. Silicon, tin, germanium and their oxides and alloys are non-limiting examples of materials that may be added to an electrode active material layer to improve its energy density, among other benefits. One particular example is the use of silicon in lithium-ion batteries. Silicon based anode active materials have potential as a replacement for the carbon material of conventional lithium-ion battery anodes due to silicon's high theoretical lithium storage capacity of 3500 to 4400 mAh/g. Such a high theoretical storage capacity could significantly enhance the energy density of the lithium-ion batteries. However, silicon active materials suffer from rapid capacity fade, poor cycle life and poor durability. One primary cause of this rapid capacity fade is the massive volume expansion of silicon (typically up to 300%) upon lithium insertion. Volume expansion of silicon can cause particle cracking and pulverization when the silicon has no room to expand. This expansion can lead to electrode delamination, electrical isolation of the active material, capacity fade due to collapsed conductive pathways, and, like carbon based electrodes, increased internal resistance over time, which decreases their ability to deliver current.

Disclosed herein are three dimensional electrode structures designed to counter this increased internal resistance caused by breakdown or expansion of the active material of battery electrodes. The three dimensional electrode structures have electron directing members that maintain substantially vertical conductive pathways throughout the life of the battery and increase lithium ion storage due to use of increased graphite in the electrode. As used herein, "vertical" refers to the stacking, or layered, direction of the electrode.

Figure 1:
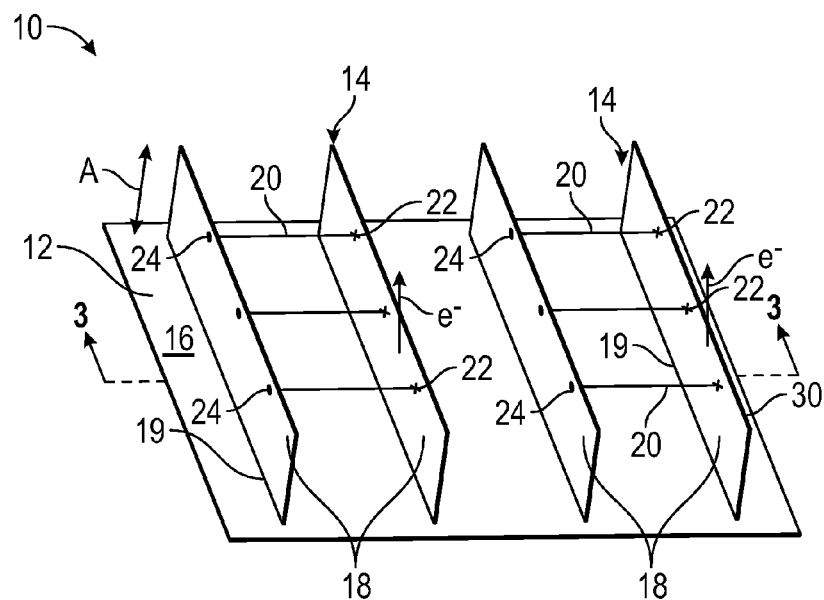
FIG. 1 is a perspective view of a three dimensional electrode as disclosed herein showing a current collector and an embodiment of electron directing members.

A three dimensional electrode has an active material layered between a current collector and a separator. FIG. 1 is an example of a three dimensional electrode 10 with the active layer and separator removed to better describe the structure. The three dimensional electrode 10 in FIG. 1 has a current collector 12 and electron directing members 14 extending from a surface 16 of the current collector 12. The electron directing members 14 are configured to direct electron flow e along a layered direction A of the three dimensional electrode 10.

The material of the current collector 12 can be a metal foil such as nickel, iron, copper, aluminum, stainless steel and carbon, as non-limiting examples, as well as any other material known to those skilled in the art for the electrode applications. The current collector 12 can have a thickness in the range of about 5 µm to about 15 µm.

The electron directing members 14 are sheets 18 of highly conductive and chemically inert material aligned vertically along the surface 16 of the current collector 12, as illustrated in FIGS. 1-4. The sheets 18 can be, as a non-limiting example, graphene sheets.

Figure 2:
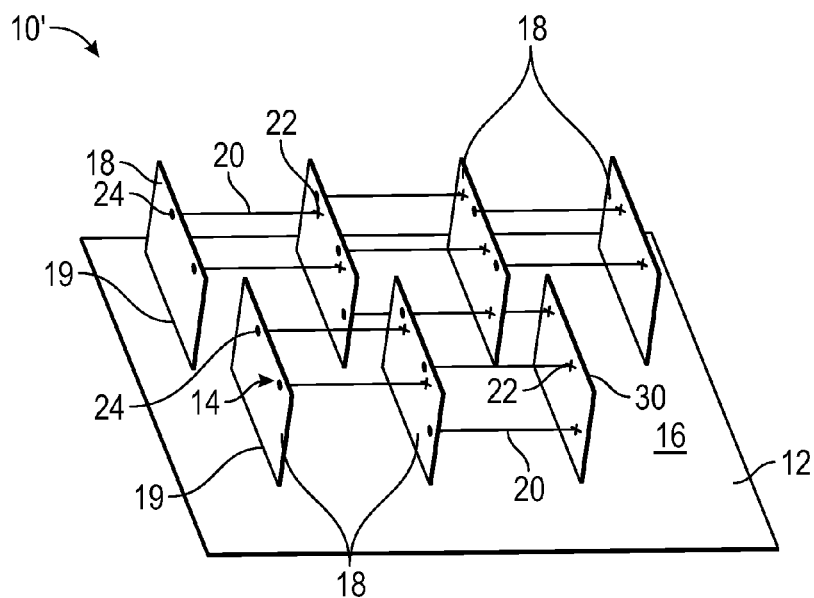
FIG. 2 is a perspective view of another three dimensional electrode as disclosed herein showing a current collector and another embodiment of electron directing members.

The electron directing members 14 can be a plurality of sheets 18 each having the same length and height, as illustrated in FIG. 1. The length of the plurality of sheets 18 can span the length or width of the current collector 12, depending on the alignment of the sheets on the current collector 12. The plurality of sheets 18 can include sheets 18 of different lengths, as illustrated in FIG. 2, with the sheets 18' spanning only a partial length or partial width of the current collector 12. A perimeter edge 19 of each sheet 18 is attached to the surface 16 of the current collector 12 with a polymer binder.

As illustrated in FIGS. 1 and 2, each pair of adjacent vertically aligned sheets 18 is separated by one or more horizontal nanotubes 20 grown from a sputtered metal 22 on one of the pair of adjacent vertically aligned sheets 18 and attached to the other of the pair of adjacent vertically aligned sheets 18 with a functional group 24. As used herein, "horizontal" refers to a direction substantially perpendicular to the current collector. As illustrated in FIGS. 1 and 2, three nanotubes 20 and two nanotubes 20 are shown, respectively, between each pair of sheets 18 by means of example only. The number of nanotubes 20 between a pair of adjacent sheets 18 is configured to support the pair of sheets 18 during alignment on the current collector 12. As a non-limiting example, the nanotubes 20 can be spaced such that each of the plurality of nanotubes 20 is separated from another nanotube 20 by between 20-50 nanometers.

The nanotubes 20 can be carbon nanotubes or can be of a magnetic material. The nanotubes 20 can be other tubular structured metal such as zinc oxide, titanium dioxide and others. The functional group 24 can be any functional group that will bond a particular nanotube 20 to the material of the sheet 18. As a non-limiting example, carboxylic acid can be used as the functional group 24 when the sheet 18 is graphene.

Figure 3:
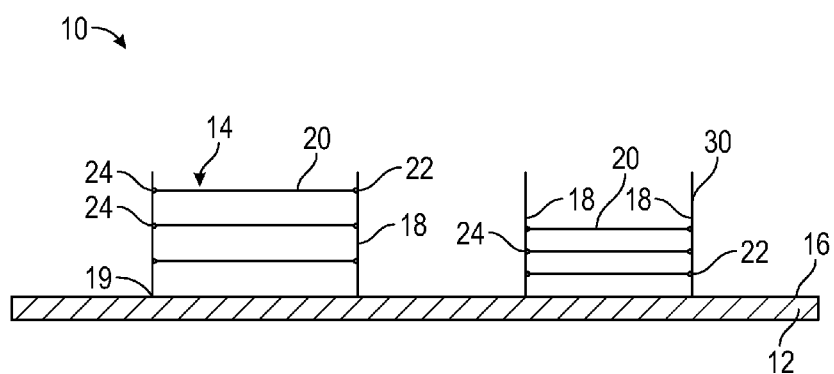
FIG. 3 is a cross section view of FIG. 1 along line 3-3.

FIG. 3 is a cross sectional view of the three dimensional electrode of FIG. 1 along line 33, illustrating how the electron directing members 14 comprise sheets that are substantially vertical to the surface 16 of the current collector 12, with the nanotubes 20 substantially horizontal to the surface 16 of the current collector 12.

Figure 4:
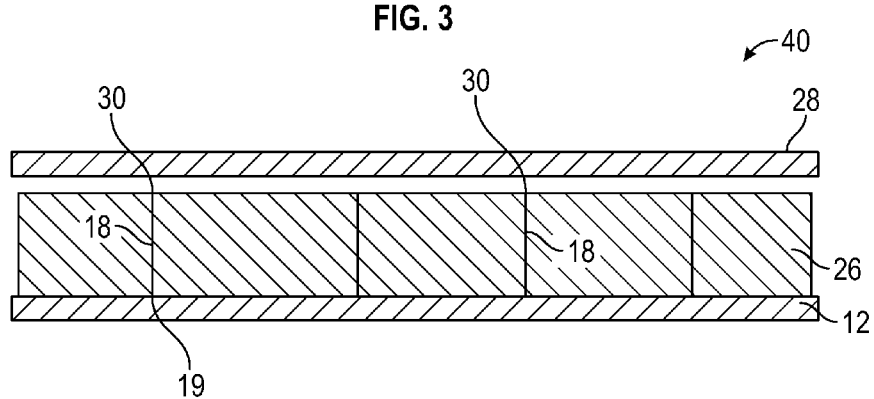
FIG. 4 is a cross sectional view of FIG. 1 along line 3-3 and including active material.

FIG. 4 is the cross sectional view of FIG. 3 with the electrode 40 including the active material layer 26 formed on the current collector 12 with the separator 28 above the active material layer 26. The sheets 18 are surrounded by the active material layer 26 and extend into the active material layer 26 to direct electrons in a substantially vertical path through the active material layer 26, reducing the amount of electrons taking a longer path through the active material layer 26. For example, electron flow substantially horizontal to the current collector 12 is reduced. Over the life of the electrode, the electron directing members 14 maintain conductive pathways, slowing the increase of internal resistance and accordingly increasing battery life. When the sheets 28 are graphene, lithium ion storage is also improved. Furthermore, the electron directing members 14 assist in restraining expansion of active material such as silicon to two dimensions, reducing issues that occur from large volume expansion, such as particle cracking and pulverization, electrode delamination, electrical isolation of the active material, capacity fade due to collapsed conductive pathways, and increased internal resistance over time, which decreases their ability to deliver current.

As illustrated in FIG. 4, each sheet 18 has a free end 30 spaced from the separator 28. The sheets 18 can extend through the entire active material layer 26, as illustrated, or can have a length less than the thickness of the active material layer 26. As a non-limiting example, the sheets 18 can have a height of between about 50 and 60 microns, so long as the distal ends 30 do not contact the separator 28. The thickness of the electrode 40 is typically about 60 nanometers. The sheets 18 can all have the same height or can have varying heights.

Also disclosed herein are batteries made with the three dimensional electrodes 10,10', 40 disclosed herein. For example, lithium ion batteries can be include the three dimensional electrodes disclosed herein. The three dimensional electrodes can be utilized as anodes, incorporating active material including, as non-limiting examples, silicon, tin and germanium, with graphite or other carbon based material. The silicon material can be silicon, a silicon alloy, a silicon/germanium composite, silicon oxide and combinations thereof. The tin material can be tin, tin oxide, a tin alloy and combinations thereof. Other high energy density materials known to those skilled in the art are also contemplated. The carbon material can include one or more of graphene, graphite, surface modified graphite, carbon nanotubes, carbon black, hard carbon, soft carbon and any other carbon materials known to those skilled in the art having the requisite electrochemical dimensional electrodes 10, 10', 40 are also disclosed herein. FIGS. 5A-5D are schematics of the three dimensional electrode 10 being formed. FIG. 6 is a flow diagram of the methods disclosed herein.

Figure 5A:
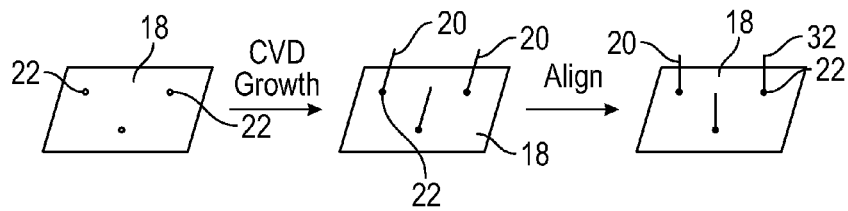
FIGS. 5A-5D are schematics of a method of making a three dimensional electrode as disclosed herein.
Figure 6:
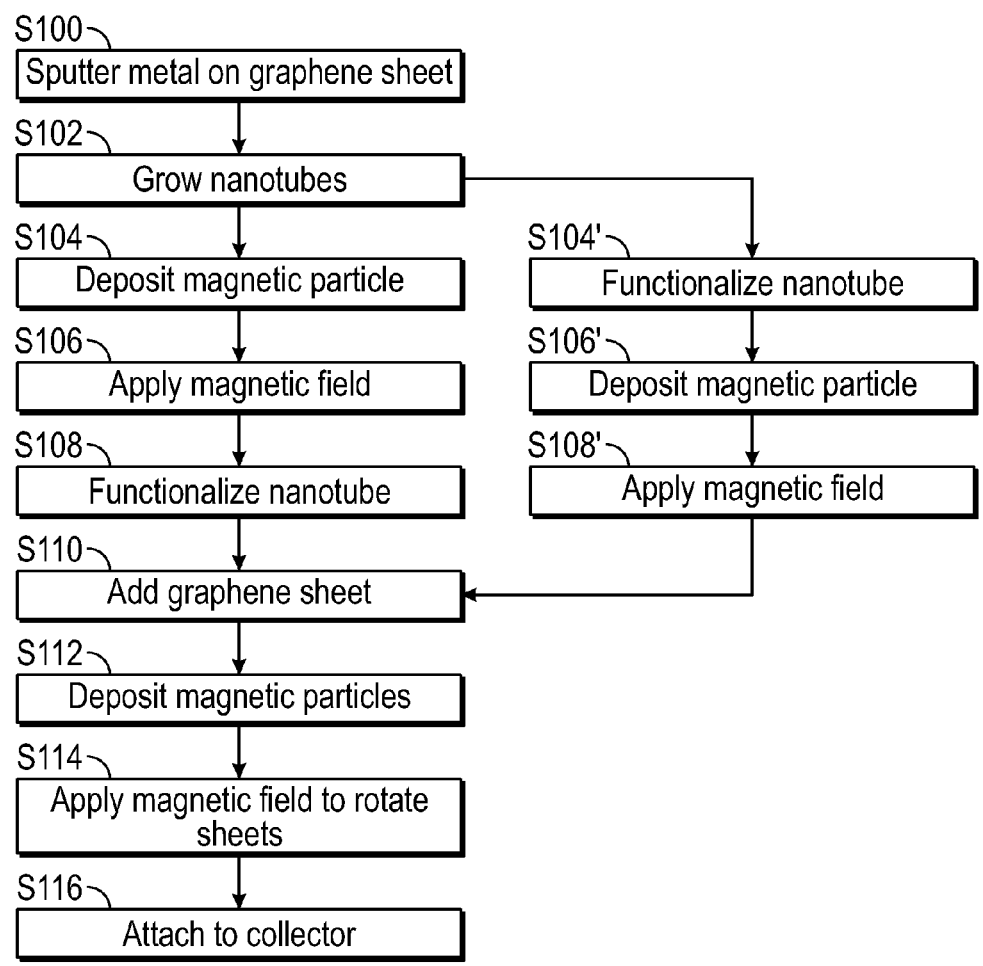
FIG. 6 is a flow diagram of a method of making the three dimensional electrode schematically illustrated in FIGS. 5A-5D.

In FIG. 5A and step S100 of FIG. 6, a metal 22 is sputtered on the electron directing material, a sheet 18 of highly conductive and chemically inert material. Nanotubes 20 are gown in step S102 at predetermined points on the first sheet 18 of electron directing material. Chemical vapor deposition or other means known to those skilled in the art to grow nanotubes can be used. As shown, the nanotubes 20 can grow in any direction. The nanotubes 20 are aligned to a substantially vertical position, or substantially perpendicular to the sheet 18, by depositing one or more magnetic particles along the nanotubes 20 in step S104 and then applying a magnetic field in step S106 to the nanotubes 20 to pull the nanotubes 20 into the vertical position. As a non-limiting example, iron magnetic particles can be deposited onto the nanotubes 20. Alternatively, if the nanotubes 20 are made of a magnetic material, step S 104, depositing the nanotubes 20 with the magnetic material, can be eliminated as the magnetic field will work directly on the nanotubes 20 to vertically align the nanotubes 20.

Figure 5B:
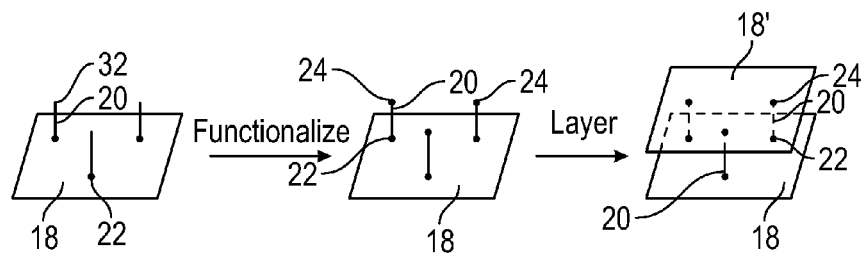

In FIG. 5B and step S 108, the aligned nanotubes 20 are functionalized at a distal end 32 of each nanotube 20. The nanotubes 20 are functionalized with a functional group 24 capable of bonding with another sheet 18' of the electron directing material. As a non-limiting example, if the second sheet 18' is graphene, the functional group 24 can be carboxylic acid. When functionalized, the second sheet 18' is bonded to the functional group 24 on the nanotubes 20 to form a pair of adjacent sheets 18, 18' in step S110.

As shown in FIG. 6, the nanotubes 20 can be functionalized in step S104' prior to depositing the magnetic material onto the nanotubes 20 in step S106'. The magnetic field is then applied in step S108' to align the nanotubes 20, and once aligned, the second sheet 18' is bonded to the functional group 24 of the nanotubes 20 in step S110.

Figure 5C:
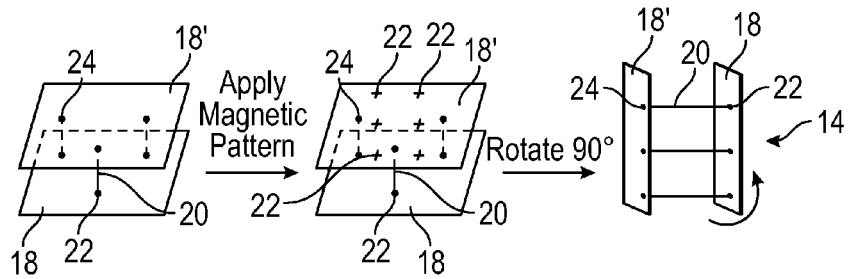

As shown in FIG. 5C and FIG. 6, additional magnetic particles 22 are deposited along the second sheet 18' in step S112. As a non-limiting example, iron magnetic particles can be deposited onto the second sheet 18'. The magnetic field is applied to the magnetized pair of sheets 18, 18' in step S114 to rotate the pair of sheets 18, 18' ninety degrees to form an electron directing structure 14.

Figure 5D:
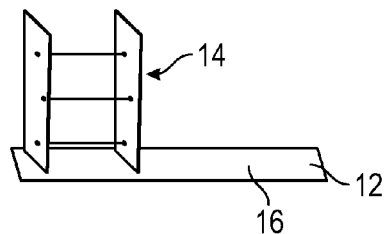

In FIG. 5D and step 5116 of FIG. 6, the electron directing structure 14 is attached to the surface 16 of the current collector 12 with a polymer binder. The current collector 12 and electron directing structure 14 can be hot-pressed as required, or can be hot-pressed after the active material layer 26 is added and dried.

All combinations of the embodiments are specifically embraced by the present invention and are disclosed herein just as if each and every combination was individually and explicitly disclosed, to the extent that such combinations embrace operable processes and/or devices/systems. In addition, all sub-combinations listed in the embodiments describing such variables are also specifically embraced by the present device and methods and are disclosed herein just as if each and every such sub-combination was individually and explicitly disclosed herein.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A method of making a three dimensional electrode having an active material layered between a current collector and a separator, the method comprising:
   growing nanotubes at predetermined points on a first sheet of electron directing material, wherein the electron directing material is highly conductive and chemically inert;
   aligning the nanotubes in a direction perpendicular to the first sheet;
   functionalizing a distal end of each nanotube;
   bonding a second sheet of electron directing material to the functionalized distal end of each nanotube;
   depositing magnetic particles along the second sheet;
   applying a magnetic field to the magnetic particles to rotate the first sheet, the second sheet and the nanotubes ninety degrees to form an electron directing structure; and
   attaching the electron directing structure on a surface of the current collector with a polymer binder, wherein the electron directing structure is configured to direct electron flow along a layered direction of the three dimensional electrode.

2. The method of claim 1, wherein growing the nanotubes comprises:
   sputtering a metal on a surface of the first sheet; and
   growing the nanotubes with chemical vapor deposition.

3. The method of claim 2, wherein the metal is magnetic, growing magnetic nanotubes, and aligning the nanotubes comprises applying a magnetic field to the nanotubes.

4. The method of claim 1 further comprising:
   depositing the active material layer on the current collector such that the electron directing structure extends along a thickness of the active material layer.

5. The method of claim 4 further comprising:
   layering electrolyte and the separator on the active material layer, wherein the end of the electron directing structure opposite the current collector is in spaced relation to the separator.

6. The method of claim 1, further comprising:
   hot-pressing the electron directing structure and the current collector.

7. The method of claim 1, wherein the nanotubes are a non-magnetic material and aligning the nanotubes comprises:
   depositing a magnetic particle on each nanotube; and
   applying a magnetic field to the magnetic particle.

8. The method of claim 1, wherein the nanotubes are carbon nanotubes.

9. The method of claim 1, wherein the electron directing material is graphene.

10. The method of claim 1, wherein the nanotubes are functionalized with carboxylic acid.

11. The method of claim 1, wherein the nanotubes are spaced from each other by a range of 20-50 nanometers.

12. The method of claim 1, wherein the electron directing structure has a height of between about 50 and 60 microns.

13. The method of claim 1, further comprising:
   after bonding the second sheet, growing nanotubes at predetermined points on the second sheet;
   aligning the nanotubes in a direction perpendicular to the second sheet;
   functionalizing a distal end of each nanotube;
   bonding a third sheet of electron directing material to the functionalized distal end of each nanotube; and
   depositing magnetic particles along a surface of the third sheet prior to applying the magnetic field to the magnetic particles.

14. A method of making a three dimensional electrode for a battery, the method comprising:

growing carbon nanotubes at predetermined points on a first sheet of graphene;

decorating the carbon nanotubes with magnetic particles;

aligning the nanotubes in a direction perpendicular to the first sheet by applying a magnetic force to the magnetic particles;

functionalizing a distal end of each nanotube;

bonding a second sheet of graphene to the functionalized distal end of each nanotube;

depositing additional magnetic particles along the second sheet;

applying a magnetic field to the additional magnetic particles to rotate the first sheet, the second sheet and the nanotubes ninety degrees to form an electron directing structure; and attaching the electron directing structure on a surface of a current collector with a polymer binder.

15. The method of claim 14 further comprising:

layering an active material layer on the current collector and around the electron directing structure, wherein the electron directing structure is configured to direct electron flow along a layered direction of the three dimensional electrode.

16. The method of claim 15 further comprising:

layering electrolyte and the separator on the active material layer, wherein the end of the electron directing structure opposite the current collector is in spaced relation to the separator.

17. The method of claim 14, wherein the nanotubes are functionalized with carboxylic acid.

18. The method of claim 14, wherein the nanotubes are spaced from each other by a range of 20-50 nanometers.

19. The method of claim 14, wherein the electron directing structure has a height of between about 50 and 60 microns.

* * * * *